(12) United States Patent
Nakashima et al.

(10) Patent No.: US 9,997,745 B2
(45) Date of Patent: Jun. 12, 2018

(54) BATTERY PACK

(71) Applicant: NEC ENERGY DEVICES, LTD., Sagamihara-shi, Kanagawa (JP)

(72) Inventors: Satoshi Nakashima, Kanagawa (JP); Makoto Unno, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 104 days.

(21) Appl. No.: 14/772,433

(22) PCT Filed: Oct. 28, 2013

(86) PCT No.: PCT/JP2013/079109
§ 371 (c)(1),
(2) Date: Sep. 3, 2015

(87) PCT Pub. No.: WO2014/141524
PCT Pub. Date: Sep. 18, 2014

(65) Prior Publication Data
US 2016/0020438 A1    Jan. 21, 2016

(30) Foreign Application Priority Data
Mar. 15, 2013 (JP) ................................. 2013-053390

(51) Int. Cl.
*H01M 2/02* (2006.01)
*H01M 2/10* (2006.01)
*H01M 10/0525* (2010.01)

(52) U.S. Cl.
CPC ....... *H01M 2/0275* (2013.01); *H01M 2/1077* (2013.01); *H01M 10/0525* (2013.01); *Y02T 10/7011* (2013.01)

(58) Field of Classification Search
CPC ............. H01M 2/0275; H01M 2/1077; H01M 10/0525
(Continued)

(56) References Cited

U.S. PATENT DOCUMENTS

| 2009/0023057 A1* | 1/2009 | Kim | ..................... H01M 2/0207 |
| | | | 429/120 |
| 2012/0100413 A1 | 4/2012 | Okano et al. | |
| 2014/0255757 A1* | 9/2014 | Kang | .................. H01M 2/0212 |
| | | | 429/149 |

FOREIGN PATENT DOCUMENTS

| CN | 101350400 A | 1/2009 |
| JP | 11-067167 A | 3/1999 |

(Continued)

OTHER PUBLICATIONS

International Search Report for PCT/JP2013/079109 dated Dec. 17, 2013.

(Continued)

*Primary Examiner* — James Lee
(74) *Attorney, Agent, or Firm* — Sughrue Mion, PLLC (57) ABSTRACT

Provided is a battery pack capable of improving volumetric efficiency while reducing the thickness of the entire battery. The battery pack is configured by laminating a plurality of film-sheathed batteries (10) each including power generating element (11) and film sheath material (12) in which internal space (13) is formed for housing power generating element (11) along with an electrolyte. Power generating element (11) includes main surfaces (11a) that are positioned on both sides in a lamination direction, and side surfaces (11b) that are adjacent to main surfaces (11a). Film sheath material (12) includes housing part (14) that is provided with main surface covering sections (14a) for covering main surfaces (11a) and side surface covering sections (14b) for covering side surfaces (11b), main surface covering sections (14a) and side surface covering sections (14b) forming internal space (13), and sealing parts (15) that protrude from side surface covering sections (14b) to seal internal space (13). In one film sheath material, sealing parts 15 are bonded to side surface covering sections (14b) of the other film (Continued)

sheath material that is adjacent to the one film sheath material in the lamination direction.

7 Claims, 5 Drawing Sheets

(58) Field of Classification Search
USPC .......................................... 429/153, 163–185
See application file for complete search history.

(56) References Cited

FOREIGN PATENT DOCUMENTS

| | | |
|---|---|---|
| JP | 2001-256933 A | 9/2001 |
| JP | 2005-267880 A | 9/2005 |
| JP | 2007-110036 A | 4/2007 |
| JP | 2009026735 A | 2/2009 |
| JP | 2010-219268 A | 9/2010 |
| JP | 2012-089415 A | 5/2012 |

OTHER PUBLICATIONS

Communication dated Jul. 3, 2017, from the State Intellectual Property Office of People's Republic of China in counterpart Application No. 201380074725.9.
Communication dated Aug. 1, 2017, from the Japanese Patent Office in counterpart application No. 2015-505224.

* cited by examiner

1a Battery pack

BATTERY PACK

CROSS REFERENCE TO RELATED APPLICATIONS

This application is a National Stage of International Application No. PCT/JP2013/079109 filed Oct. 28, 2013, claiming priority based on Japanese Patent Application No. 2013-053390, filed Mar. 15, 2013, the contents of all of which are incorporated herein by reference in their entirety.

TECHNICAL FIELD

The present invention relates to a battery pack configured by laminating a plurality of film-sheathed batteries each including a power generating element that is housed together with electrolyte in a film sheath material.

BACKGROUND ART

In recent years, a secondary battery represented by a lithium-ion battery is attached not only to a portable device such as a mobile phone or a digital camera but also to an electric bicycle, an electric motorcycle, or an automobile. With the diversification of the applications of the secondary battery, battery weight reduction and increased design freedom have become current requirements. A film-sheathed battery that uses a light and flexible film sheath material has emerged as a secondary battery that is capable of satisfying these requirements. In addition, for applications that require a large amount of power, there are battery packs that are configured by laminating a plurality of film-sheathed batteries.

Film-sheathed batteries generally include a power generating element provided with a positive electrode and a negative electrode, and a film sheath material to cover the power generating element. The film sheath material preferably serves to prevent electrolyte injected therein from leaking or moisture from entering into the battery. Therefore, on the outer peripheral part of the film sheath material, a sealing part in which resin surfaces are thermally bonded to each other is provided. The sealing part is a portion that does not function as a battery. Accordingly, when the space that a sealing part occupies in an installation space for a battery is large, volumetric efficiency (energy efficiency per unit volume) deteriorates. Thus, a technology for solving such a problem is disclosed in Patent document 1.

Figure 1:
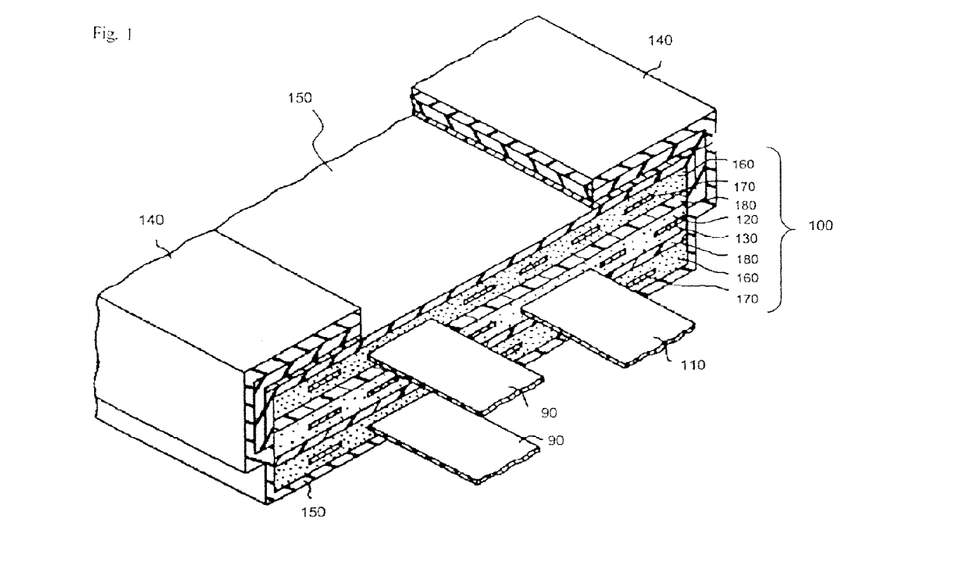
FIG. 1 A perspective view illustrating a sheet type battery disclosed in Patent document 1.

FIG. 1 is a perspective view illustrating a sheet type battery disclosed in Patent document 1. In the sheet type battery illustrated in FIG. 1, unit cell 100 is housed in two thermal bonding seal films 150. Unit cell 100 includes a positive electrode that is provided with positive electrode layer 160 and current collector 170, a negative electrode that is provided with negative electrode layer 120 and current collector 130, and solid electrolyte layer 180 that is formed between the positive electrode and the negative electrode. Positive electrode terminal 90 is fitted to the positive electrode. Negative electrode terminal 110 is fitted to the negative electrode.

Thermal bonding part 140 is provided on the outer peripheral part of thermal bonding seal film 150. Thermal bonding part 140 is folded along the shape of unit cell 100 to be bonded to the upper surface of thermal bonding seal film 150. Therefore, the outer dimensions of the sheet type battery are reduced, and volumetric efficiency can be improved.

PRIOR ART DOCUMENTS

Patent Documents

Patent document 1: JP H11-67167A

SUMMARY OF INVENTION

Problems to be Solved by Invention

In the above-mentioned sheet type battery, thermal bonding part 140 (sealing part) is bonded to the upper surface of thermal bonding seal film 150. Accordingly, when this sheet type battery is used for a battery pack, the thickness of thermal bonding part 140 is added to that of the battery pack. As a result, since the number of laminated sheet type batteries is larger, the thickness of the battery pack is much greater, thus causing enlargement of the battery.

It is therefore an object of the present invention to provide a battery pack capable of improving volumetric efficiency while reducing the thickness of an entire battery.

Means to Solve the Problems

In order to achieve the above-mentioned object, a battery pack according to the present invention is configured by laminating a plurality of film-sheathed batteries each including a power generating element in which positive electrodes and negative electrodes are alternately laminated via separators, and a film sheath material in which an internal space is formed for housing the power generating element along with an electrolyte. The power generating element includes main surfaces positioned on both sides in a lamination direction, and side surfaces that are adjacent to the main surfaces. The film sheath material includes a housing part that is provided with main surface covering sections for covering the main surfaces and side surface covering sections for covering the side surfaces, the main surface covering sections and the side surface covering sections that form the internal space, and sealing parts that protrude from the side surface covering sections to seal the internal space. In one film sheath material, the sealing part is bonded to the side surface covering section of the other film sheath material that is adjacent to the one film sheath material in the lamination direction.

Effects of Invention

According to the present invention, volumetric efficiency can be improved while reducing the thickness of the entire battery.

EXEMPLARY EMBODIMENTS OF THE INVENTION

First Exemplary Embodiment

Figure 2:
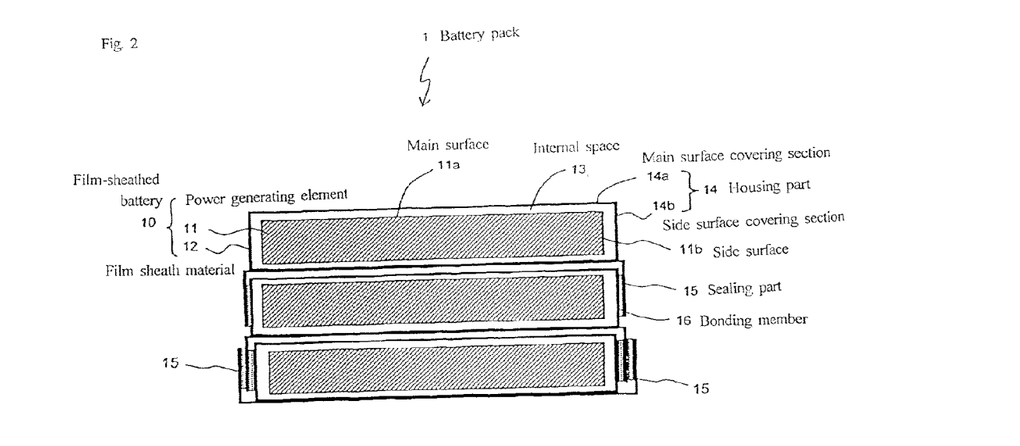
FIG. 2 A sectional view illustrating the structure of a battery pack according to a first exemplary embodiment.
Figure 3:
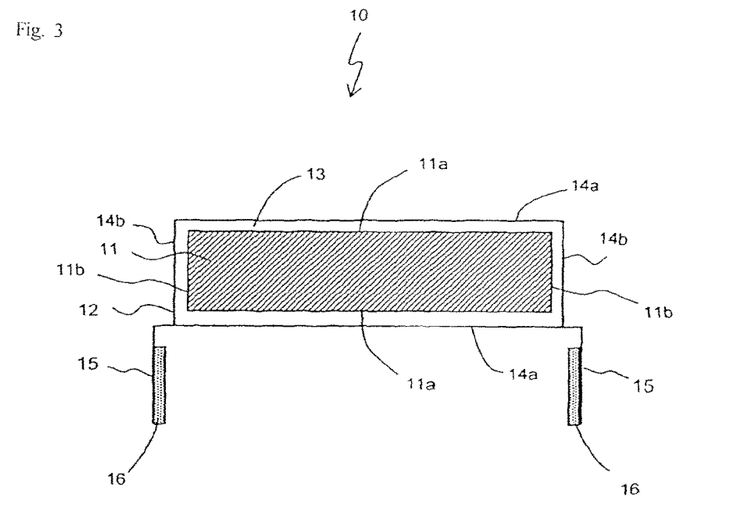
FIG. 3 A sectional view illustrating the structure of a film-sheathed battery illustrated in FIG. 1.
Figure 4:
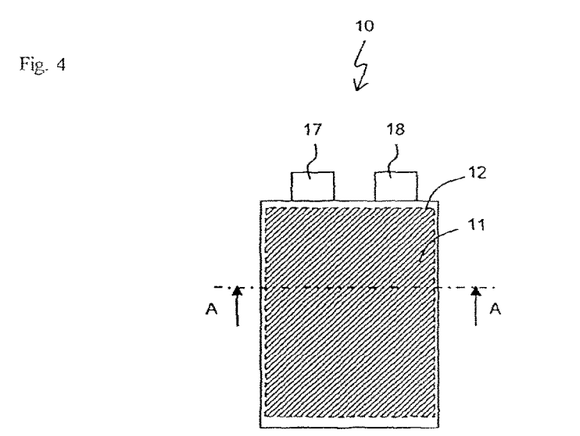
FIG. 4 A plan view illustrating a film-sheathed battery illustrated in FIG. 2.
Figure 5:
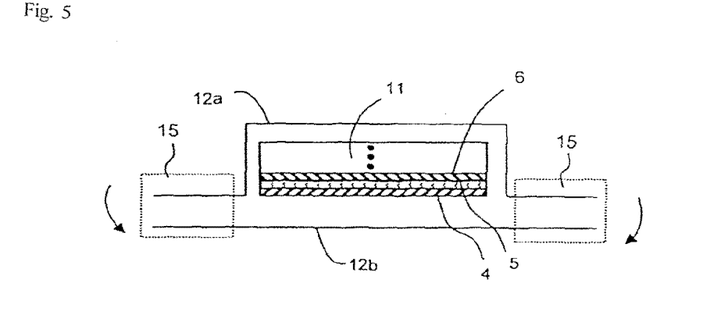
FIG. 5 An exploded view illustrating the film-sheathed battery illustrated in FIG. 2.

FIG. 2 is a sectional view illustrating the structure of a battery pack according to a first exemplary embodiment. Battery pack 1 illustrated in FIG. 2 includes a plurality of laminated film-sheathed batteries 10. FIG. 3 is a sectional view illustrating the structure of film-sheathed battery 10 illustrated in FIG. 2. FIG. 4 is a plan view illustrating film-sheathed battery 10 illustrated in FIG. 3. FIG. 3 corresponds to a section cut along the line A-A illustrated in FIG. 4. FIG. 5 is an exploded view illustrating the film-sheathed battery illustrated in FIG. 3.

As illustrated in FIGS. 2 and 3, each film-sheathed battery 10 includes chargeable and dischargeable power generating element 11, and film sheath material 12 in which internal space 13 is formed for housing power generating element 11 along with electrolyte. Power generating element 11 is configured by alternately laminating pluralities of positive electrodes 4 and negative electrodes 6 via separators 5 (refer to FIG. 5). Positive electrode lead terminal 17 (refer to FIG. 5) is connected to positive electrode 4. Negative electrode lead terminal 18 (refer to FIG. 4) is connected to negative electrode 6. According to the exemplary embodiment, as illustrated in FIG. 4, positive electrode lead terminal 17 and negative electrode lead terminal 18 protrude in the same direction from power generating element 11. Positive electrode lead terminal 17 and negative electrode lead terminal 18 may protrude in opposite directions from power generating element 11.

As illustrated in FIG. 3, film sheath material 12 includes recessed housing part 14 in which internal space 13 is formed, and sealing parts 15 for sealing internal space 13. Housing part 14 includes main surface covering sections 14a for covering main surfaces 11a of power generating element 11, and side surfaces 14b for covering side surfaces 11b of power generating element 11. Main surfaces 11a are surfaces that are positioned on both sides of power generating element 11 in a lamination direction. Side surfaces 14b are surfaces that are adjacent to main surfaces 11a.

As illustrated in FIG. 5, according to the exemplary embodiment, film sheath material 12 includes two film materials 12a and 12b. According to the exemplary embodiment, film sheath material 12a includes above-mentioned housing part 14. According to the present invention, film sheath material 12 may be formed into a shape in which one film material is folded in two.

Figure 6:
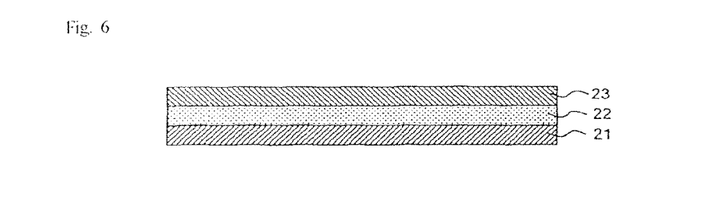
FIG. 6 A diagram illustrating the sectional structure of film material.

FIG. 6 is a diagram illustrating the sectional structure of each of film materials 12a and 12b. As illustrated in FIG. 6, each of film materials 12a and 12b is a laminate configured by laminating together three or more layers that include at least resin layer 21, metallic layer 22, and resin layer 23. Resin layer 21 is made of a thermally weldable synthetic resin such as polyethylene or polypropylene. Metallic layer 22 is made of metallic foil such as aluminum or SUS (Steel Use Stainless). Resin layer 23 is made of a highly weatherable resin such as polyamide, polyethylene terephthalate, or nylon. Internal space 13 is sealed by thermally fusion bonding the outer peripheral parts of resin layers 21 of the respective film materials to each other. The thermally fusion bonded portion is sealing part 15. As illustrated in FIG. 5, sealing parts 15 are folded in the same direction. Then, sealing parts 15 are bonded by bonding members 16 (refer to FIG. 2) to side surface covering parts 14b of the other housing part that is positioned one layer below housing part 14. For bonding member 16, double-sided tape or adhesive can be applied.

Figure 11:
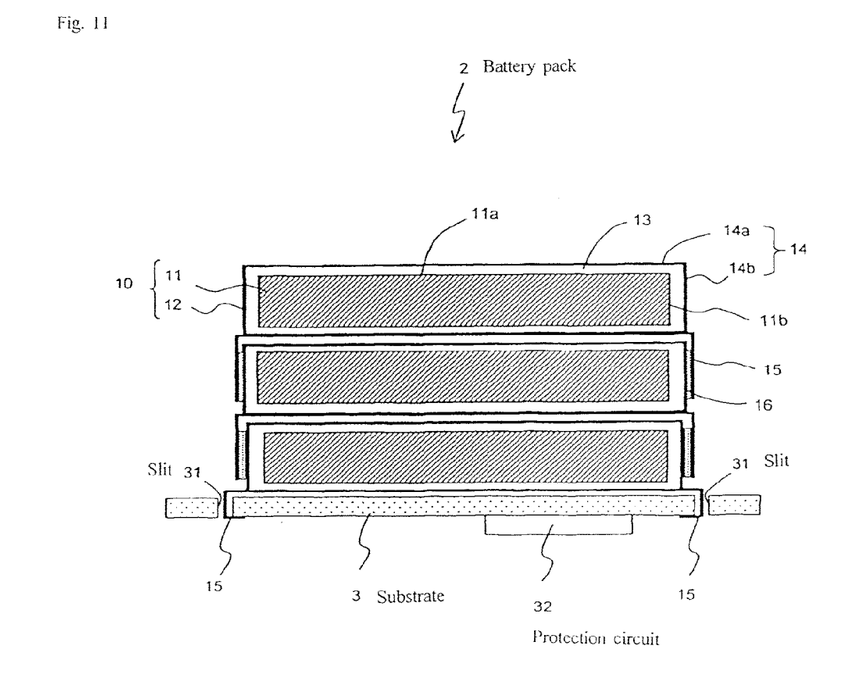
FIG. 11 A sectional view illustrating the structure of a battery pack according to a second exemplary embodiment.

As described above, in battery pack 1 according to the exemplary embodiment, sealing parts 15 of film-sheathed battery 10 are bonded to side surface covering sections 14b that is positioned one layer below. Further, sealing parts 15 of lowermost film sheath material 12 (end film sheath material) are bonded by bonding members 16 to sealing parts 15 (other sealing parts) that are bonded to side surface covering sections 14b. Therefore, the thickness of sealing part 15 is not added to that of battery pack 1. As a result, the thickness of the entire battery can be reduced compared to a case where sheet type batteries, as illustrated in FIG. 11, are laminated.

Further, in battery pack 1 according to the exemplary embodiment, in addition to the bonding of sealing parts 15 to side surface covering sections 14b, main surface covering sections 14a are bonded to each other by double-sided tape or adhesive. Accordingly, since film-sheathed battery 10 has two bonding surfaces, film-sheathed batteries 10 are more firmly fixed to each other. As a result, the shock resistance of battery pack 1 is increased.

In battery pack 1 according to the exemplary embodiment, sealing parts 15 are bonded to each other in lowermost film-sheathed battery 10. According to the present invention, sealing parts 15 may be bonded to each other in uppermost film-sheathed battery 10.

Figure 7A:
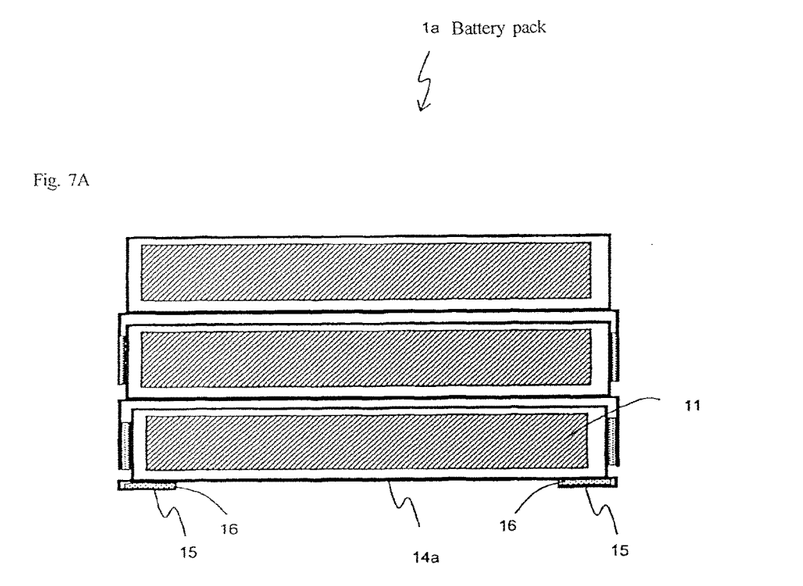
FIG. 7A A sectional view illustrating a modified example of the battery pack according to the first exemplary embodiment.
Figure 7B:
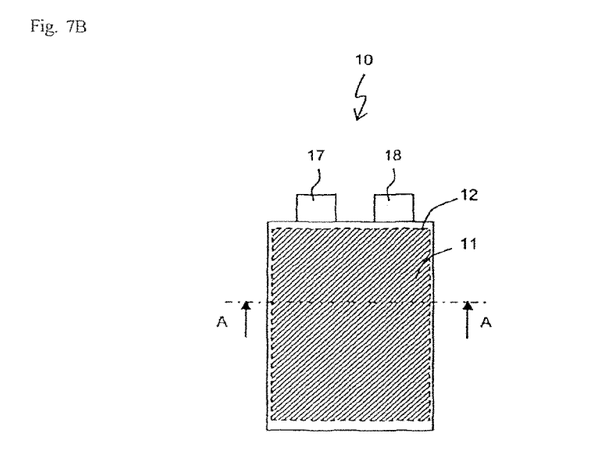
FIG. 7B A plan view illustrating the modified example of the battery pack according to the first exemplary embodiment.

FIG. 7A is a sectional view illustrating a modified example of the battery pack according to the first exemplary embodiment. FIG. 7B is a plan view illustrating the modified example of the battery pack according to the first exemplary embodiment. FIG. 7A is the sectional view cut along the line A-A illustrated in FIG. 7B. As illustrated in FIG. 7A, in lowermost film-sheathed battery 10 or uppermost film-sheathed battery 10, sealing parts 15 may be bonded to main surface covering section 14a by bonding members 16. In this case, the thickness of one sealing part 15 is added to that of battery pack 1a. However, the thickness of the entire battery can be substantially reduced compared to case of a battery pack that is configured by laminating the sheet-type batteries illustrated in FIG. 1.

Figure 8A:
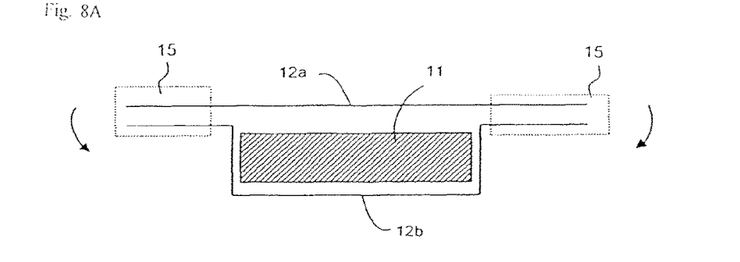
FIG. 8A A sectional view illustrating a modified example of film sheath material.
Figure 8B:
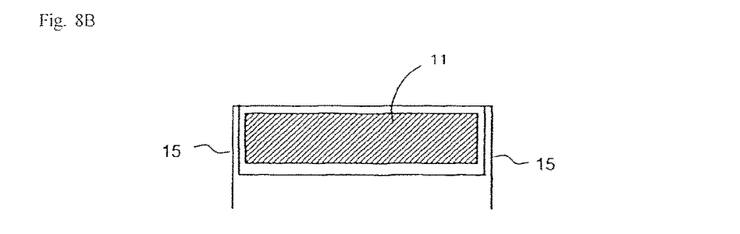
FIG. 8B A sectional view illustrating the folded state of the film sheath material illustrated in FIG. 8A.

FIG. 8A is a sectional view illustrating a modified example of film sheath material 12. FIG. 8B is a sectional view illustrating the folded state of the film sheath material illustrated in FIG. 8A. In battery pack 1 according to the exemplary embodiment, the recessed part is formed in film material 12a that is positioned on the upper side in the lamination direction. However, according to the present invention, as illustrated in FIG. 8A, a recessed part may be formed in film material 12b that is positioned on the lower side in the lamination direction. In this case, two sealing parts 15 (thermally bonded parts) that seal internal space 13 along the longitudinal directions of side surfaces 11b of power generating element 11 are folded in the same direction (refer to FIG. 8B).

Figure 9A:
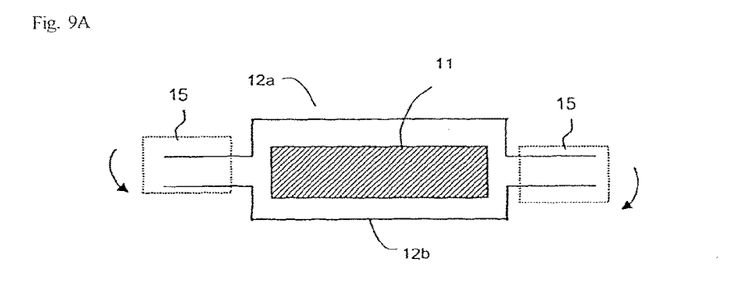
FIG. 9A A sectional view illustrating another modified example of the film sheath material.
Figure 9B:
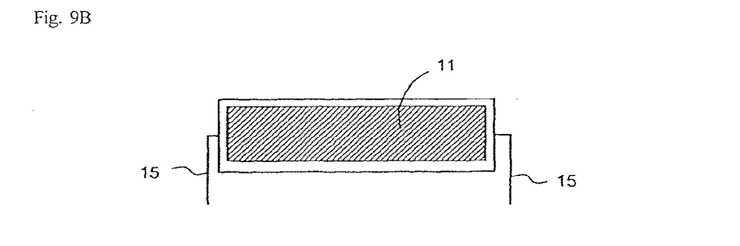
FIG. 9B A sectional view illustrating the folded state of the film sheath material illustrated in FIG. 9A.

FIG. 9A is a sectional view that illustrates another modified example of film sheath material 12. FIG. 9B is a sectional view that illustrates the folded state of the film sheath material illustrated in FIG. 9A. According to the present invention, as illustrated in FIG. 9A, a recessed part that functions as housing part 14 may be formed in each of film members 12a and 12b. In this case, two sealing parts 15 (thermally bonded parts) that seal internal space 13 along the longitudinal directions of side surfaces 11b of power generating element 11 are folded in the same direction (refer to FIG. 9B).

Figure 10A:
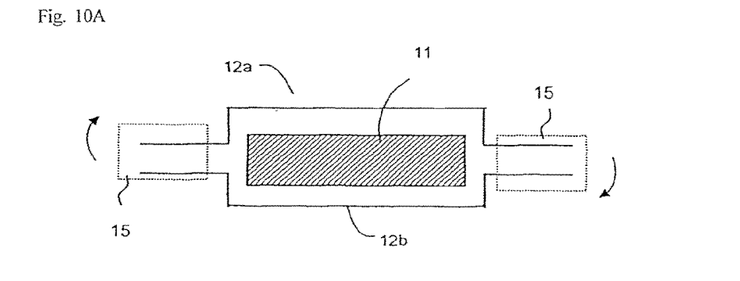
FIG. 10A A sectional view illustrating yet another modified example of the film sheath material.
Figure 10B:
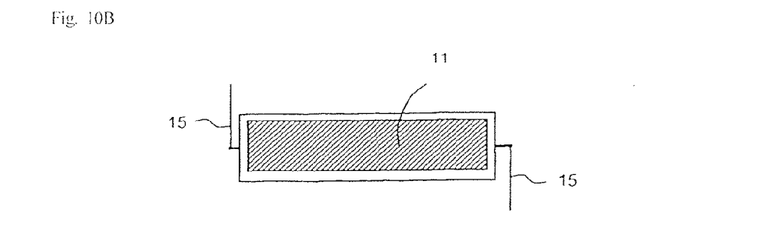
FIG. 10B A sectional view illustrating the folded state of the film sheath material illustrated in FIG. 10A.
Figure 10C:
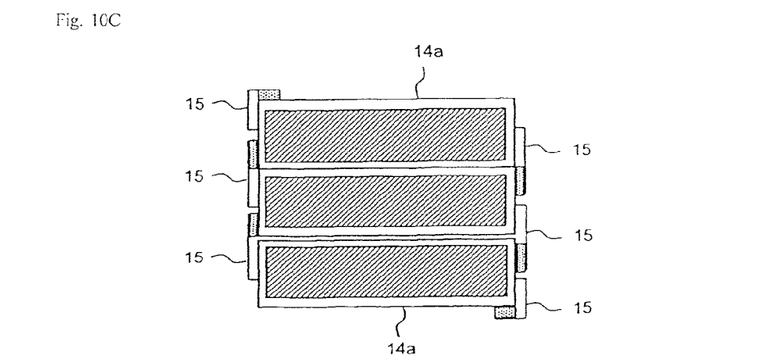
FIG. 10C A sectional view illustrating a battery pack provided with the film sheath material illustrated in FIG. 10B.

FIG. 10A is a sectional view that illustrates yet another modified example of film sheath material 12. FIG. 10B is a sectional view that illustrates the folded state of the film sheath material illustrated in FIG. 10A. FIG. 10C is a sectional view that illustrates a battery pack that is provided with the film sheath material illustrated in FIG. 10B. According to the present invention, as illustrated in FIG. 10A, a recessed part that functions as housing part 14 may be formed in each of film members 12a and 12b. In this case, two sealing parts 15 (thermally bonded parts) that seal internal space 13 along the longitudinal direction of side surfaces 11b of power generating element 11 are folded in opposite directions (refer to FIG. 10B). In this case, as illustrated in FIG. 10C, one (first sealing part) of sealing parts 15 is bonded to side surface covering section 14b that is located one layer above, while the other (second sealing part) of sealing parts 15 is bonded to side surface covering section 14b that is located one layer below. One of sealing parts 15 at the uppermost layer is folded to be bonded to main surface covering section 14a, while the other of sealing parts 15 at the lowermost layer is folded to be bonded to main surface covering section 14a.

Second Exemplary Embodiment

The second exemplary embodiment of the present invention will be described. The description below will focus on differences from the first exemplary embodiment. FIG. 11 is a sectional view that illustrates the structure of a battery pack according to the second exemplary embodiment. Components similar to those of battery pack 1 according to the first exemplary embodiment are denoted by similar reference numbers, and detailed description thereof will be omitted.

As illustrated in FIG. 11, battery pack 2 according to the exemplary embodiment further includes substrate 3 that faces lowermost film-sheathed battery 10. Substrate 3 includes protection circuit 32 for stopping the charging and discharging of power generating element 11. Protection circuit 6 may be provided separately from substrate 5 as in the case of the exemplary embodiment, or substrate 5 itself may double as a protection circuit. In substrate 3, slits 31 are formed so as to penetrate substrate 3 in a lamination direction. Lowermost sealing part 15 is inserted through slit 31 to be fixed to substrate 3.

In battery pack 2 according to the exemplary embodiment, as in the case of battery pack 1, sealing parts 15 are bonded to side surface conversing sections 14b that are adjacent thereto in the lamination direction. Accordingly, since the thickness of sealing part 15 is not added to that of battery pack 2, the thickness of the entire battery can be reduced.

Further, in battery pack 2 according to the exemplary embodiment, lowermost film-sheathed battery 10 is integrated with substrate 3. Accordingly, shocks to lowermost film-sheathed battery 10 can be mitigated to a greater degree compared to a case in which film-sheathed battery 10 is not integrated with substrate 3.

According to the present invention, substrate 3 may be arranged on uppermost film-sheathed battery 10. In addition, the formation of slits 31 in substrate 3 is not essential. Sealing part 15 at the uppermost layer or sealing part 15 at the lowermost layer may be directly bonded to the surface of substrate 3.

The present invention has been described referring to the exemplary embodiments. However, the present invention is not limited to the exemplary embodiments. Various changes that are understandable to those skilled in the art can be made to the configuration and the specifics of the present invention within the scope of the invention.

This application claims priority from Japanese Patent Application No. 2013-53390 filed on Mar. 15, 2013, which is hereby incorporated by reference herein in its entirety.

DESCRIPTION OF REFERENCE NUMBERS 1, 2 Battery pack
3 Substrate
4 Positive electrode
5 Separator
6 Negative electrode
10 Film-sheathed battery
11 Power generating element
11a Main surface
11b Side surface
12 Film sheath material
13 Internal space
14 Housing part
14a Main surface covering section
14b Side surface covering section
15 Sealing part
16 Bonding member
21 Resin layer
22 Metallic layer
23 Resin layer
31 Slit
32 Protection circuit
90 Positive electrode terminal
100 Unit cell
110 Negative electrode terminal
120 Negative electrode layer
130 Current collector
150 Thermally bonding seal film
160 Positive electrode layer
170 Current collector
180 Solid electrolyte layer

The invention claimed is:

1. A battery pack for stacking a plurality of laminated film-sheathed batteries comprising: a plurality of laminated film-sheathed batteries each comprising a power generating element in which positive electrodes and negative electrodes are alternately laminated via separators, and a film sheath material in which an internal space is formed for housing the power generating element along with an electrolyte, wherein:
  the power generating element comprises main surfaces that are positioned on both sides in a lamination direction, and side surfaces that are adjacent to the main surfaces;
  the film sheath material comprises a housing part that is provided with main surface covering sections for covering the main surfaces and side surface covering sections for directly covering the side surfaces, the main surface covering sections and the side surface covering sections forming the internal space, and sealing parts that protrude from the side surface covering sections to seal the internal space;
  the sealing parts of at least one laminated film-sheathed battery of the plurality of laminated film-sheathed batteries are directly bonded to the side surface covering section of an adjacent laminated film-sheathed battery of the plurality of laminated film-sheathed batteries; and
  the sealing parts of at least one laminated film-sheathed battery of the plurality of laminated film-sheathed batteries are separately formed from the side surface covering sections of an adjacent laminated film-sheathed battery of the plurality of laminated film-sheathed batteries.

2. The battery pack for stacking a plurality of laminated film-sheathed batteries according to claim 1, wherein in an end laminate film-sheathed battery of the plurality of laminated film-sheathed batteries that comprises an uppermost power generating element or lowermost power generating element, the sealing parts of the end laminated film-sheathed battery are bonded to the sealing parts of an adjacent laminated film-sheathed battery of the plurality of laminated film-sheathed batteries that are bonded to the side surface covering sections of the end laminated film-sheathed battery.

3. The battery pack for stacking a plurality of laminated film-sheathed batteries according to claim 1, wherein in an end laminated film-sheathed battery of the plurality of laminated film-sheathed batteries that comprises an uppermost power generating element or a lowermost power generating element, the sealing parts of the end laminated film-sheathed battery are bonded to the main surface covering sections of the end laminated film-sheathed battery.

4. The battery pack for stacking a plurality of laminated film-sheathed batteries according to claim 1, further comprising a substrate that faces the main surface covering sections of an end laminated film-sheathed battery of the plurality of laminated film-sheathed batteries that comprises an uppermost power generating element or lowermost power generating element,
  wherein the sealing parts of the end laminated film-sheathed battery are fixed to the substrate.

5. The battery pack for stacking a plurality of laminated film-sheathed batteries according to claim 4, wherein a slit is formed so as to penetrate the substrate in the lamination direction, and the sealing parts of the end laminated film-sheathed battery are inserted through the slit to be fixed to the substrate.

6. The battery pack for stacking a plurality of laminated film-sheathed batteries according to claim 4, wherein the substrate comprises a protection circuit for stopping charging and discharging of the power generating elements.

7. The battery pack for stacking a plurality of laminated film-sheathed batteries according to claim 1, wherein the sealing parts of a laminated film-sheathed battery of the plurality of laminated film-sheathed batteries comprises a first sealing part that is bonded to a side surface covering section of the side surface covering sections of an adjacent above laminated film-sheathed battery of the plurality of laminated film-sheathed batteries, and a second sealing part that is bonded to a side surface covering section of the side surface covering sections of an adjacent below laminated film-sheathed battery of the plurality of laminated film-sheathed batteries.

* * * * *

UNITED STATES PATENT AND TRADEMARK OFFICE
CERTIFICATE OF CORRECTION

PATENT NO. : 9,997,745 B2
APPLICATION NO. : 14/772433
DATED : June 12, 2018
INVENTOR(S) : Satoshi Nakashima and Makoto Unno Page 1 of 1

It is certified that error appears in the above-identified patent and that said Letters Patent is hereby corrected as shown below:

In the Claims

Column 7, Claim 1, Line 22; "section" has been replaced with --sections-- therefor Column 7, Claim 2, Line 33; "laminate" has been replaced with --laminated-- therefor Signed and Sealed this
Nineteenth Day of February, 2019

Andrei Iancu
*Director of the United States Patent and Trademark Office*